United States Patent
Caliskan et al.

(10) Patent No.: US 7,311,169 B1
(45) Date of Patent: Dec. 25, 2007

(54) DOOR SYSTEM FOR AUTOMOTIVE VEHICLE

(75) Inventors: Ari Caliskan, Canton, MI (US); Allen Preston, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 11/162,769

(22) Filed: Sep. 22, 2005

(51) Int. Cl.
*B60J 5/00* (2006.01)

(52) U.S. Cl. .................. 180/274; 296/146.6; 296/68.1

(58) Field of Classification Search ............... 180/274, 180/281, 286, 271; 49/31; 296/146.6, 68.1
See application file for complete search history.

(56) References Cited

U.S. PATENT DOCUMENTS

| | | | | |
|---|---|---|---|---|
| 3,151,698 | A * | 10/1964 | Pollock ...................... 180/281 |
| 3,468,392 | A * | 9/1969 | Hass .......................... 180/281 |
| 3,793,498 | A * | 2/1974 | Matsui et al. ......... 200/61.45 R |
| 3,819,228 | A * | 6/1974 | Cornacchia .............. 296/146.9 |
| 3,972,549 | A * | 8/1976 | Valade ....................... 292/182 |
| 4,191,399 | A * | 3/1980 | Garvey et al. .............. 280/806 |
| 4,307,911 | A * | 12/1981 | Pavlik .................... 296/187.12 |
| 5,033,236 | A * | 7/1991 | Szerdahelyi et al. .......... 49/502 |
| 5,570,922 | A | 11/1996 | DeRees et al. |
| 5,740,993 | A | 4/1998 | Siepe-Noll |
| 5,800,007 | A * | 9/1998 | Cho ........................ 296/146.6 |
| 5,806,917 | A * | 9/1998 | Townsend ................... 296/202 |
| 6,052,634 | A * | 4/2000 | Pathe et al. .................... 701/45 |
| 6,053,565 | A | 4/2000 | Cho |
| 6,312,045 | B2 * | 11/2001 | Kitagawa ............... 296/187.12 |
| 6,328,359 | B1 | 12/2001 | Pacella et al. |
| 6,420,803 | B1 | 7/2002 | Woodall et al. |
| 6,422,631 | B1 | 7/2002 | Schmidt et al. |
| 6,592,166 | B2 | 7/2003 | Motozawa |
| 6,601,910 | B1 * | 8/2003 | Duggan ................. 296/203.03 |
| 6,786,534 | B1 | 9/2004 | Peng |
| 6,926,340 | B2 * | 8/2005 | Moriyama ............... 296/146.6 |
| 6,959,947 | B2 * | 11/2005 | Sakakida et al. ........... 280/803 |
| 7,021,697 | B2 * | 4/2006 | Bodin et al. ............. 296/146.6 |
| 2002/0153742 | A1 * | 10/2002 | Ishikawa ................. 296/146.6 |
| 2004/0100388 | A1 * | 5/2004 | Yoshida et al. .......... 340/686.1 |
| 2004/0119318 | A1 | 6/2004 | Moriyama |
| 2005/0082799 | A1 * | 4/2005 | Breed et al. ............. 280/730.2 |
| 2005/0178601 | A1 * | 8/2005 | Galvani et al. ............. 180/271 |
| 2006/0021815 | A1 * | 2/2006 | Ohtaka ....................... 180/274 |
| 2006/0255576 | A1 * | 11/2006 | Levine ....................... 280/735 |
| 2007/0052259 | A1 * | 3/2007 | Roccato et al. ........ 296/187.03 |
| 2007/0063538 | A1 * | 3/2007 | Menke ..................... 296/146.9 |

* cited by examiner

*Primary Examiner*—Paul N. Dickson
*Assistant Examiner*—Karen J. Amores
(74) *Attorney, Agent, or Firm*—Gigette M. Bejin; Dickinson Wright PLLC

(57) ABSTRACT

A door system for an automotive vehicle includes an impact-responsive catcher pin which may be operated by a supplemental restraint system having side impact sensing capability so that the impact-responsive catcher pin may be directed to deploy from a housing mounted within a vehicle door, to a position in which the catcher pin locks the vehicle door to a rocker beam adjoining the door.

17 Claims, 4 Drawing Sheets

DOOR SYSTEM FOR AUTOMOTIVE VEHICLE

TECHNICAL FIELD

The present invention relates to an automotive vehicle having a door with an impact-responsive catcher pin for limiting intrusion of the door into the vehicle's passenger compartment in the event of a side impact against the door.

BACKGROUND

Automotive designers have devised an array of solutions to the situation presented by the need to manage energy and deformation in the event of a side impact upon a vehicle. More precisely, in the event that a side facing passenger door of a vehicle is impacted during a collision, it is generally desirable to limit intrusion by the door into the passenger compartment. However, a very rigid door suffering little deformation during a heavy impact would cause more kinetic energy to be transferred to the vehicle, which is not necessarily desirable. U.S. Pat. No. 6,053,565 discloses a solution to limiting door intrusion in the course of a side impact, which includes a side impact bar having a pyrotechnically driven component which is extended into the B pillar of the vehicle in the event of a side impact. The system of the '565 patent does not address the issue of controlling recession of the bottom part of the door in the event of a side impact, nor does it provide a system which locks in place with the structure into which the stopper pin is engaged.

A system and method according to the present invention solves the problems with prior art devices by providing positive locking of the vehicle door to the rocker beam underlying the door, with the deployment of the catcher pin being controlled by a supplemental restraint system onboard the vehicle.

SUMMARY

A door system for an automotive vehicle includes a door having an inner panel and an outer panel and a door opening panel defining at least part of a door opening which is closable by the door. A rocker beam extends under the door so as to define a portion of the door opening. The rocker beam runs generally parallel to the lowermost portion of the door's outer panel. At least one impact-responsive catcher pin is contained within a housing mounted within the door between the inner panel and outer panel. The catcher pin has a first telescopic position in which the catcher pin is contained entirely within the door and a second telescopic position, responsive to impact upon the door, in which the catcher pin extends from the door into a receiver formed in the rocker beam. The catcher pin is preferably located near the intersection of a seatback and seat cushion mounted within the vehicle and adjoining the door opening.

A catcher pin according to the present invention is driven by a stored energy device which may include a pyrotechnic charge, or a compressed gas canister, or compression spring, or other types of stored energy linear actuators known to those skilled in the art and suggested by this disclosure.

The present system also includes a beam mounted within the door between the inner panel and the outer panel and extending generally along the length of the door, with the catcher pin housing being mounted at least in part to the beam. The catcher pin has a integral sprag which is formed upon the shank of the pin so as to prevent the pin from becoming disengaged from the rocker beam after the pin is deployed.

The present impact-responsive catcher pin is preferably activated by a side impact detection system which also activates at least a side airbag, or any other supplemental restraint device such as a side curtain supplemental restraint device. As an alternative, any one of a number of impact detection systems commonly used with vehicles may be employed for the purpose of determining an appropriate time for deploying the inventive impact-responsive catcher pin.

According to another aspect of the present invention, a method for controlling side intrusion of a vehicle door into a passenger compartment includes the steps of sensing an impact against a vehicle door, using a supplemental restraint system to generate an activation signal in the event that an impact against a door is sensed, and using the activation signal to activate a stored energy device to drive a catcher pin housed within the door into a receiver contained within a rocker beam adjacent the door such that the pin will resist translational movement of the door toward the balance of the passenger compartment.

Is an advantage of a system according to the present invention that door intrusion resulting from side impact upon a vehicle may be mitigated while at the same time mitigating the amount of kinetic energy transferred to the vehicle.

It is a further advantage of a system according to the present invention that the present catcher pin remains hidden within the door until deployed in the event of a side impact.

It is a further advantage of a method and system according to the present invention that because the catcher pin is deployed by a supplemental restraint system, deployment of the pin may be coordinated with deployment of other supplemental restraints such as side airbags or air curtains.

It is a further advantage of a system according to the present invention that only the affected door or doors, i.e., those doors to which an impact is directed, need be latched to their respective rocker beams, when the present system is teamed with a supplemental restraint system capable of identifying the vehicle side being impacted.

It is a further advantage of a system according to the present invention that the system has a low installed weight and may be packaged within vehicle doors having current designs.

Other advantages, as well as features and objects of the present invention, will become apparent to the reader of this specification.

DETAILED DESCRIPTION OF THE PREFERRED EMBODIMENT

Figure 1:
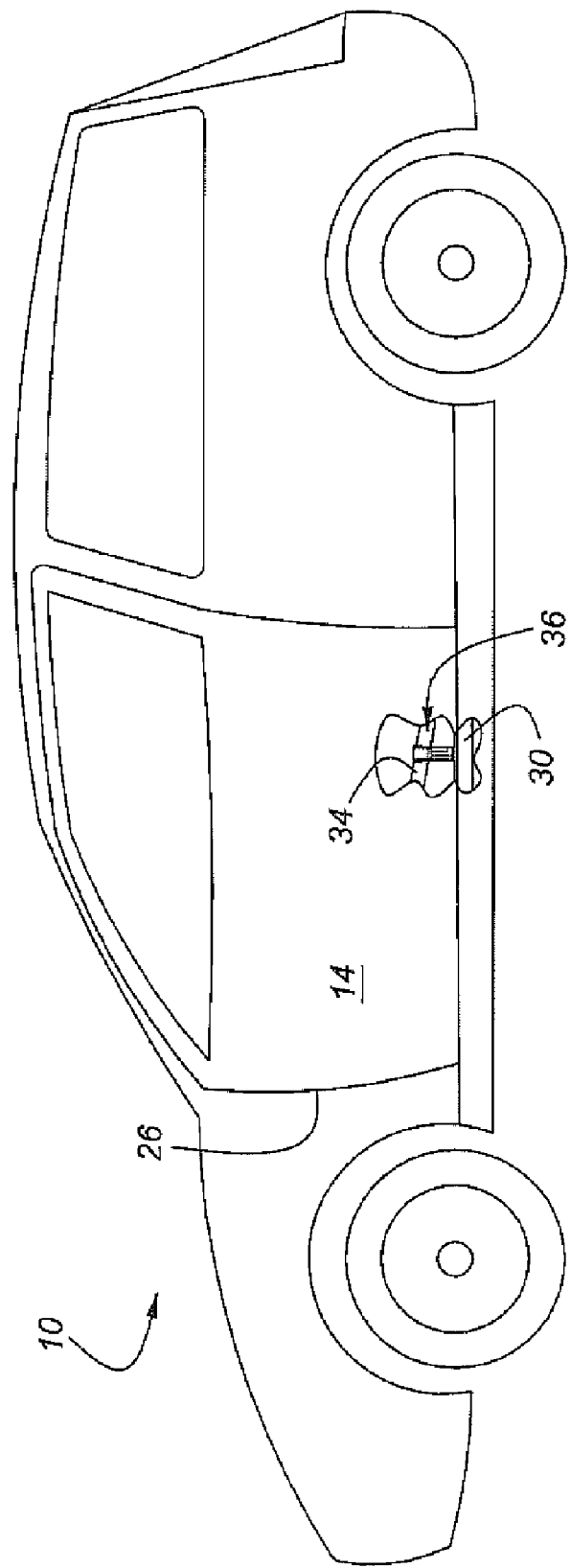
FIG. 1 is a side elevation of an automotive vehicle having a system according to the present invention.

In the following figures the same reference numerals will be used to illustrate the same components.

Figure 2:
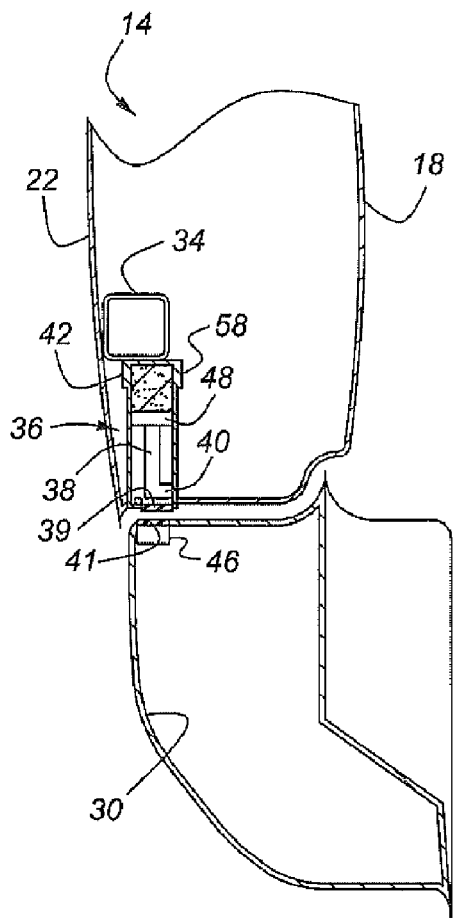
FIG. 2 is a sectional view of a door having a deployable catcher pin according to the present invention, shown in its stowed, or normal, state.
Figure 4:
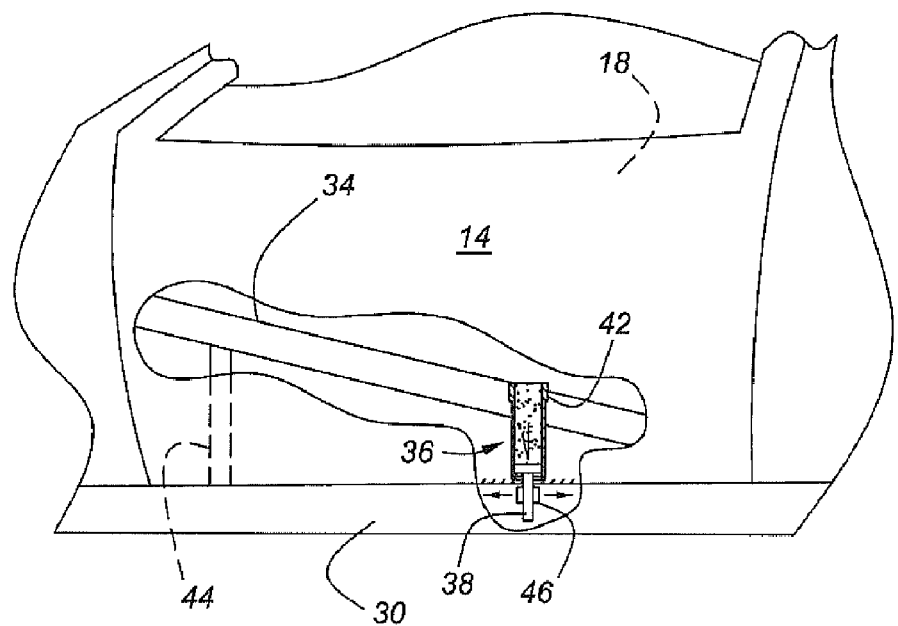
FIG. 4 is a plan view of a door showing various components of a system according to the present invention.

As shown in FIG. 1, vehicle 10 has door 14 into which a catcher pin assembly 36 is mounted. As shown in FIG. 2, door 14 has inner panel 18 and outer panel 22. Door beam 34, which is shown more precisely in FIG. 4, is mounted within door 14 between inner panel 18 and outer panel 22 and extends generally along the length of the door. Catcher pin housing 42 is mounted at least in part to door beam 34, using conventional joining techniques such as mechanical fasteners, adhesives, welding, and other types of fastening known to those skilled in the art and suggested by this disclosure.

Figure 3:
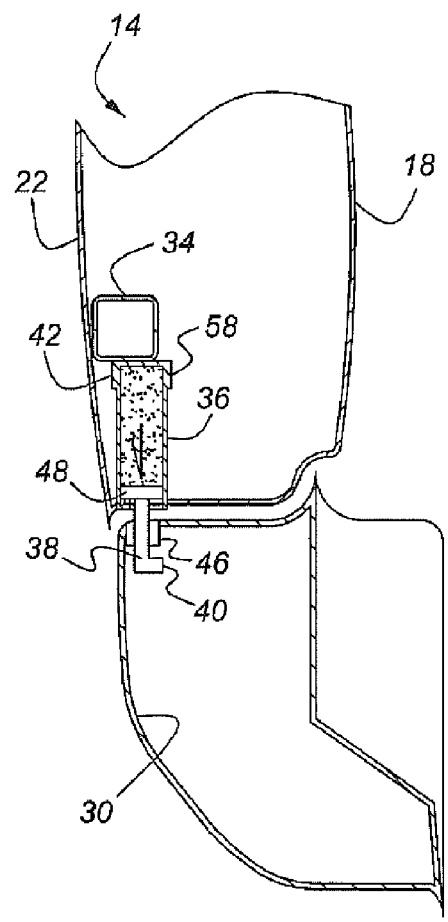
FIG. 3 is similar to FIG. 2, but shows the deployable catcher pin in its deployed state.

FIG. 2 shows catcher pin 38 as having a shank, and sprag 40 which is unitary with pin 38. Piston 48 is also unitary with catcher pin 38 and allows gas pressure to build up within housing 42 when pyrotechnic device 58 is fired, such that catcher pin 38 will be driven from the location shown in FIG. 2 to its second telescopic position, shown in FIG. 3 in which catcher pin 38 and sprag 40 extend within receiver 46, which is carried by rocker beam 30. The lowermost portion of housing 42 is normally closed by elastomeric plug 39, which prevents contamination of catcher pin assembly 36. Receiver 46 is normally covered by either a plastic cover, 41 (FIG. 2) or by a trim panel (not shown), which is suitably prepared for the insertion of pin 38. Such preparation may include localized weakening of the panel to permit easy passage of pin 38.

The latched, or deployed, position of pin 38 is also shown in FIG. 4. Once catcher pin 38 has been moved to its second telescopic position within receiver 46, an impact load directed against door 14, or more precisely, directed against outer door outer panel 22, will be resisted by catcher pin 38, which will be urged to remain locked with receiver 46 by sprag 40. In this manner, translational movement of door 14 with respect to rocker beam 30 and the remaining portion of the vehicle body will be mitigated.

Figure 5:
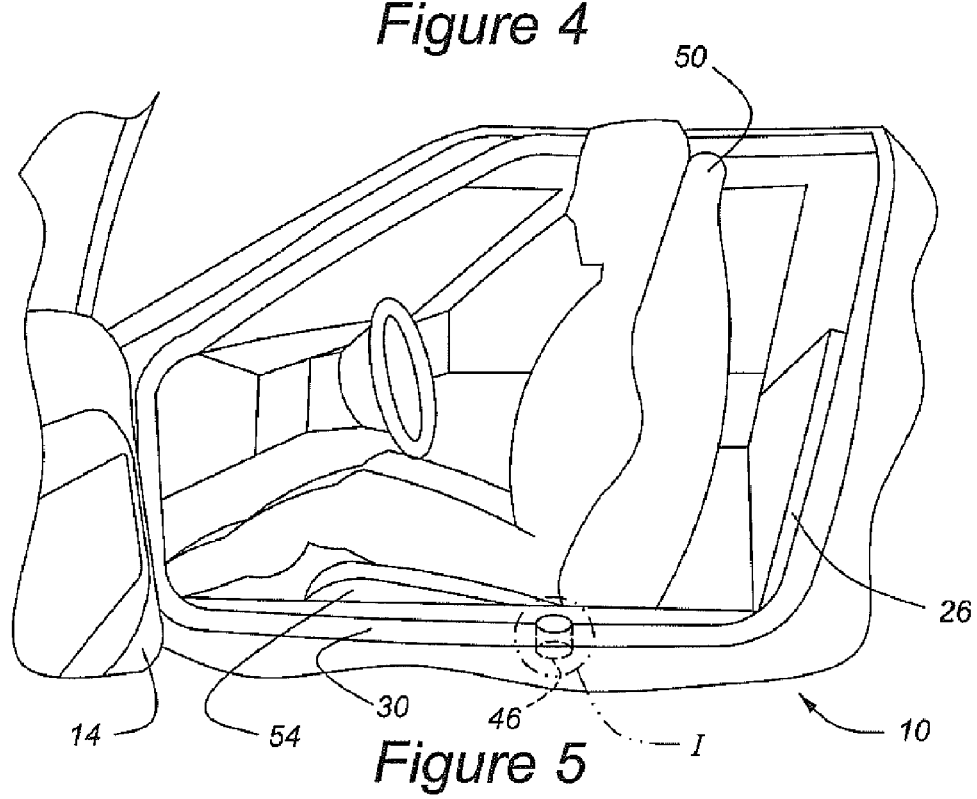
FIG. 5 is a side elevation of a vehicle with the door open, showing the position of a rocker beam receiver into which a catcher pin is driven and latched according to the present invention.

In some applications, it may be desirable to add a second impact-responsive catcher pin, shown at 44 in FIG. 4. If a single impact-responsive catcher pin is used with the present system, it is desirable to mount the catcher pin in the vicinity of the intersection of seatback 50 and seat cushion 54, with the intersection being shown at I in FIG. 5.

Figure 6:
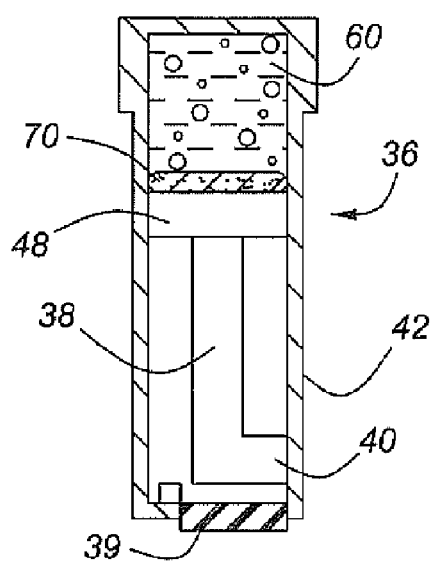
FIG. 6 shows a catcher pin driven by compressed gas.
Figure 7:
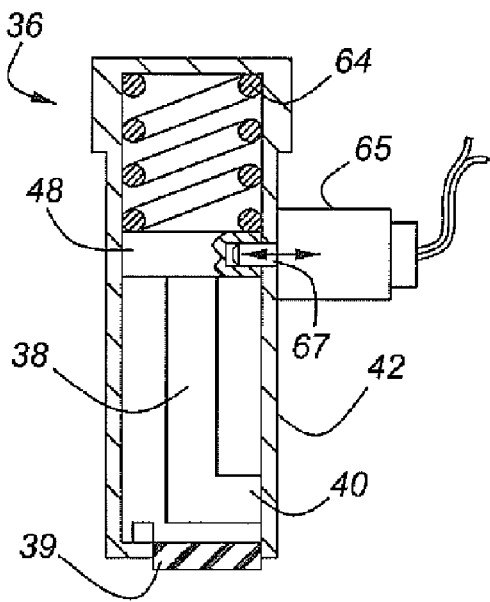
FIG. 7 is similar to FIG. 6, but illustrates a catcher pin driven by a compression spring.

FIGS. 6 and 7 show alternative stored energy devices for activating the present catcher pin. For example, in FIG. 6, a canister of compressed gas, releasable by firing explosive diaphragm 70, is employed. In the embodiment of FIG. 7, compression spring 64 is releasable by solenoid 65, which operates pin 67. In both cases, deployment of the catcher pin will be controlled as described below.

Figure 8:
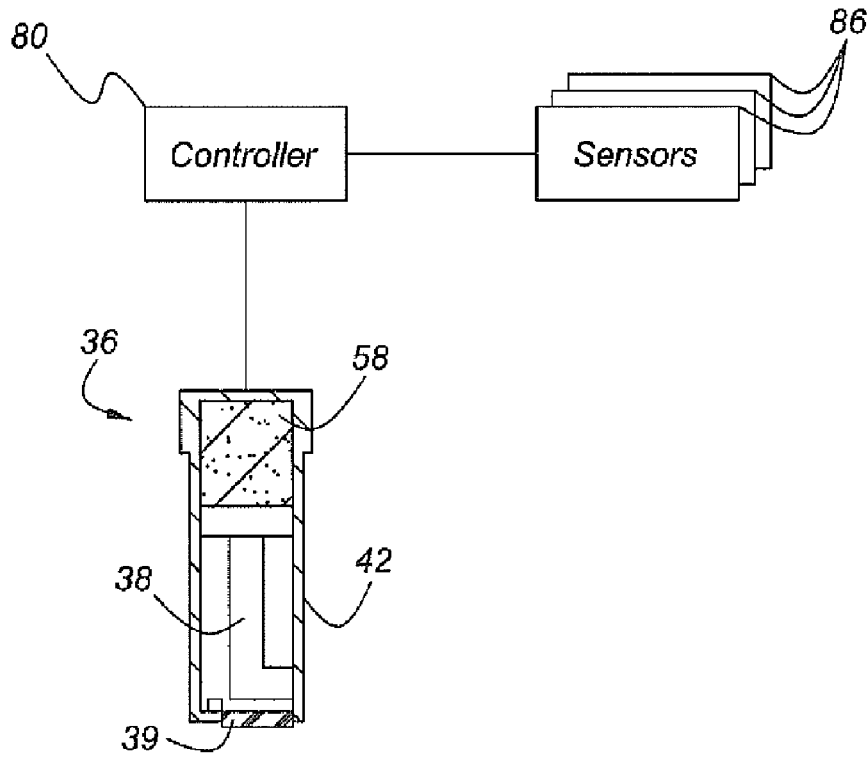
FIG. 8 illustrates a control system for operating an impact-sensitive door catcher pin according to the present invention.

Regardless of the type of stored energy device driving catcher pin 38 from its first telescopic position in door 14 into interlocking relationship with rocker beam 30, deployment of the catcher pin will be controlled by a system according to FIG. 8. Thus, controller 80 receives inputs from a variety of sensors 86 known to those skilled in the art of occupant restraint engineering and suggested by this disclosure, and including such sensors as accelerometers, seat occupant sensing, vehicle speed sensors, and other sensors. Controller 80, having received inputs from the variety of sensors 86, may conclude that an impact is being directed against a door equipped with the present impact-sensitive catcher pin. Controller 80 will then direct pyrotechnic charge 58, or solenoid 65, or explosive diaphragm 70, to place catcher pin 38 into its deployed position. Alternatively, controller 80 may be programmed to deploy pin 38 in the event of other types of impacts, such as vehicle inversions.

In essence, once an impact against a vehicle, whether upon a door, or other vehicle structure, is sensed, the vehicle's supplemental restraint system will generate an activation signal and use that activation signal to activate a stored energy device to drive the catcher pin into the receiver contained within the rocker beam.

While particular embodiments of the invention have been shown and described, numerous variations and alternate embodiments will occur to those skilled in the art. Accordingly, it is intended that the invention be limited only in terms of the appended claims.

What is claimed is:

1. A door system for an automotive vehicle, comprising:
a door having an inner panel and an outer panel;
a door opening panel defining at least part of an door opening which is closable by said door;
a rocker beam extending under said door, so as to define a portion of the door opening, and running generally parallel to the lowermost portion of said outer panel; and
at least a first impact-responsive catcher pin contained within a housing mounted within said door between said inner panel and said outer panel, with said catcher pin having a first telescopic position in which the catcher pin is contained entirely within the door and a second telescopic position, responsive to an impact upon the vehicle, in which the catcher pin extends from the door into a receiver formed in said rocker beam.

2. A door system according to claim 1, wherein said catcher pin is located proximate the intersection of a seatback and seat cushion mounted within a vehicle and adjoining said door opening.

3. A door system according to claim 2, further comprising a second catcher pin mounted within said door forward of said first catcher pin.

4. A door system according to claim 1, wherein said catcher pin is driven by a stored energy device.

5. A door system according to claim 4, wherein said stored energy device comprises a pyrotechnic charge.

6. A door system according to claim 4, wherein said stored energy device comprises a compressed gas canister.

7. A door system according to claim 4, wherein said stored energy device comprises a compression spring.

8. A door system according to claim 1, further comprising a beam mounted within said door between said inner panel and said outer panel and extending generally along the length of said door, with said catcher pin housing being mounted at least in part to said beam.

9. A door system according to claim 1, wherein the portion of said catcher pin which extends into the door following an impact upon the door comprises a shank having an integral sprag formed thereon.

10. A door system according to claim 1, wherein said impact-responsive catcher pin is activated by an impact detection system carried within a vehicle.

11. A door system according to claim 1, wherein said impact-responsive catcher pin is activated by a side impact detection system which activates at least a side airbag supplemental restraint device.

12. A door system according to claim 1, wherein said impact-responsive catcher pin is activated by a side impact detection system which activates at least a side curtain supplemental restraint device.

13. An automotive vehicle, comprising:
a body having a door opening panel defining at least part of an door opening which is closable by said door, and a rocker beam extending under said door, so as to define a portion of the door opening;
a door having an inner panel and an outer panel, with the door being hingedly mounted so as to close said door opening;
a supplemental restraint control system for detecting an impact upon said body; and
an impact-responsive catcher pin contained within a housing mounted within said door between said inner panel and said outer panel, with said catcher pin having a first telescopic position in which the catcher pin is contained entirely within the door and a second telescopic position, responsive to an impact upon the door, in which the catcher pin is deployed by the supplemental restraint control system so as to extend from the door into a receiver formed in said rocker beam.

14. An automotive vehicle according to claim 13, wherein said catcher pin is driven by a stored energy device.

15. An automotive vehicle according to claim 14, wherein said stored energy device comprises a pyrotechnic charge.

16. An automotive vehicle according to claim 13, wherein said catcher pin housing is attached at least in part to a side intrusion beam mounted within said door between said inner panel and said outer panel and extending generally along the length of said door.

17. A method for controlling side intrusion of a vehicle door into a passenger compartment, comprising the steps of:
sensing an impact against a vehicle door;
using a supplemental restraint system to generate an activation signal in the event that an impact against said door is sensed; and
using said activation signal to activate a stored energy device to drive a catcher pin, housed within the door, into a receiver contained within a rocker beam adjacent the door, such that said pin will resist translational movement of the door toward the passenger compartment.

* * * * *

UNITED STATES PATENT AND TRADEMARK OFFICE
CERTIFICATE OF CORRECTION

| | | |
|---|---|---|
| PATENT NO. | : 7,311,169 B1 | Page 1 of 1 |
| APPLICATION NO. | : 11/162769 | |
| DATED | : December 25, 2007 | |
| INVENTOR(S) | : Ari Caliskan and Allen Preston | |

It is certified that error appears in the above-identified patent and that said Letters Patent is hereby corrected as shown below:

Claim 1, Column 4, Line 22, should read as follows: -- a door opening panel defining at least part of a door --

Claim 13, Column 5, Line 7, should read as follows: -- of a door opening which is closable by said door, and --

Signed and Sealed this

Twenty-seventh Day of May, 2008

JON W. DUDAS
*Director of the United States Patent and Trademark Office*